United States Patent
Keh et al.

(10) Patent No.: US 12,305,023 B2
(45) Date of Patent: May 20, 2025

(54) CELLULOSIC SUPERABSORBENT POLYMER FROM POST-CONSUMER TEXTILE WASTE

(71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Alex Chan, Hong Kong (CN); Mimi Hetti, Hong Kong (CN); Yang Liu, Hong Kong (CN); Hung Chan, Hong Kong (CN); Xin Chen, Hong Kong (CN); Wendy Yu, Hong Kong (CN); Hosanna Poon, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 937 days.

(21) Appl. No.: 17/310,861

(22) PCT Filed: Sep. 24, 2019

(86) PCT No.: PCT/CN2019/107499
§ 371 (c)(1),
(2) Date: Aug. 27, 2021

(87) PCT Pub. No.: WO2020/173087
PCT Pub. Date: Sep. 3, 2020

(65) Prior Publication Data
US 2022/0081539 A1 Mar. 17, 2022

Related U.S. Application Data

(60) Provisional application No. 62/810,989, filed on Feb. 27, 2019.

(51) Int. Cl.
*C08L 1/10* (2006.01)
*C08B 15/10* (2006.01)
(Continued)

(52) U.S. Cl.
CPC ............... *C08L 1/10* (2013.01); *C08B 15/10* (2013.01); *C08J 11/14* (2013.01); *C08L 1/02* (2013.01);
(Continued)

(58) Field of Classification Search
None
See application file for complete search history.

(56) References Cited

U.S. PATENT DOCUMENTS 3,589,364 A * 6/1971 Dean ....................... C08B 11/12
162/146
4,175,183 A * 11/1979 Ayers ....................... B01J 41/16
536/87

(Continued)

FOREIGN PATENT DOCUMENTS

CN 108467499 A 8/2018
CN 108745219 A 11/2018
(Continued)

OTHER PUBLICATIONS

Hou Wensheng et al., "Separation and Characterization of Waste Cotton/polyester Blend Fabric with Hydrothermal Method", Fibers and Polmers, the Korean Fiber Society, Seoul, vol. 19, No. 4, Jun. 23, 2018 (Jun. 23, 2018), pp. 742-750, XP036532890, ISSN: 1229-9197, DOI: 10.1007/S12221-018-7735-9.
(Continued)

*Primary Examiner* — Peter A Salamon
(74) *Attorney, Agent, or Firm* — S&F/WEHRW

(57) ABSTRACT

The present disclosure provides methods of preparing cellulosic superabsorbent polymer (SAP) using cellulose powder.

16 Claims, 10 Drawing Sheets

(51) Int. Cl.
*C08J 11/14* (2006.01)
*C08L 1/02* (2006.01)

(52) U.S. Cl.
CPC ........ *C08J 2301/02* (2013.01); *C08J 2367/02* (2013.01); *C08J 2401/02* (2013.01); *C08J 2467/02* (2013.01); *C08L 2207/20* (2013.01); *C08L 2312/00* (2013.01)

(56) References Cited

U.S. PATENT DOCUMENTS

| | | | | | |
|---|---|---|---|---|---|
| 4,178,439 | A | * | 12/1979 | Ayers | ........................ B01J 39/22 536/112 |
| 4,186,238 | A | * | 1/1980 | Holst | ................... B01D 69/141 428/326 |
| 4,194,024 | A | * | 3/1980 | Holst | ................... D06M 15/09 427/206 |
| 4,200,558 | A | * | 4/1980 | Holst | ........................ C08L 1/08 524/45 |
| 5,421,960 | A | * | 6/1995 | Canary | ................. D21H 27/26 162/162 |
| 2003/0129719 | A1 | * | 7/2003 | Ayers | ................... A23C 9/1465 435/183 |
| 2015/0299957 | A1 | * | 10/2015 | Patane | .................... C08B 15/00 162/175 |
| 2017/0304356 | A1 | * | 10/2017 | Sannino | ................. A61K 38/10 |
| 2022/0081539 | A1 | * | 3/2022 | Keh | ........................ C08B 15/10 |

FOREIGN PATENT DOCUMENTS

| | | | |
|---|---|---|---|
| JP | 2010018670 | A | 1/2010 |
| JP | 2015101597 | A * | 6/2015 |

OTHER PUBLICATIONS

Chang C et al., "Superabsorbent hydrogels based on cellulose for smart swelling and controllable delivery", European Polymer Journal, Pergamon Press LTD Oxford, GB, vol. 46, No. 1, Jan. 1, 2010 (Jan. 1, 2010), pp. 92-100, XP026771475, ISSN: 0014-3057, DOI: 10.1016/J.EURPOLYMJ.2009.04.033.

Extended European Search Report of application No. 19916592.9 issued from the European Patent Office on Oct. 27, 2022.

* cited by examiner

CELLULOSIC SUPERABSORBENT POLYMER FROM POST-CONSUMER TEXTILE WASTE

CROSS-REFERENCE TO RELATED APPLICATIONS

This application claims the benefit of priority of U.S. Provisional Application No. 62/810,989, filed on Feb. 27, 2019, the contents of which are hereby incorporated by reference in their entirety for all purposes.

TECHNICAL FIELD

The present disclosure generally relates to a method for preparing superabsorbent polymer (SAP) using cellulose powder. More particularly, the present disclosure relates to the production of cellulosic SAP using cellulose powder obtained from chemical treatment of cotton and cotton blended textiles.

BACKGROUND

Textile waste is significant issue due to high demand for textile products. In order to reduce the amount of textile waste disposed of in landfills and incinerated, chemical methods for recycling textiles has attracted considerable research interest. Separation of blended textiles (e.g., polyethylene terephthalate (PET)/cotton blend) has been achieved by chemical hydrothermal treatment (China Patent Application No. 2017108069704) under subcritical conditions in the presence of an acidic catalyst. Under these conditions, polyester fibers can be recovered with almost no de-polymerization and can be used for spinning, whereas the cotton fibers in the polyester-cotton blends can be selectively decomposed to cellulose powder. Cellulose powder prepared from such chemical hydrothermal treatment of textiles is a useful raw material.

A number of methods for converting cellulose to cellulosic superabsorbent particles (SAPs) have been developed. SAPs are able to absorb large amounts of liquid relative to their own mass, but do not dissolve in water.

SAPs have many applications, such as in baby diapers, adult incontinent diapers or female sanitary napkins. Almost all commercial water absorbing SAPs on the market are made of acrylate, i.e., a petrochemical derived material. Since cellulosic SAPs can be biodegraded, they are more environmentally friendly than non-biodegradable acrylate based SAPs on the market.

A common method for preparing cellulosic SAP involves crosslinking cellulose to produce a cellulose polymer network, which can have superabsorbent properties. For example, WO2010002597A2 discloses crosslinked carboxyalkyl cellulose-starch SAP prepared incorporating metal crosslinks between carboxyalkyl cellulose and starch. Other methods involve the preparation of mixed polymer composite fibers having superabsorbent properties. For example, US 20080078514A1 and US 20080082067A1 disclose preparing composite fibers by adhesion, but the methods requires complex procedures.

However, there are no existing methods for preparing cellulosic SAPs from textile waste as the raw material. Therefore, there is a need to develop improved methods of preparing cellulosic SAPs from post-consumer textiles that address at least some of the issues described above.

SUMMARY

Accordingly, it is an object of the present disclosure to provide a method of preparing cellulosic SAP from cellulose powder degraded from textiles and more particularly, post-consumer textile waste.

In a first aspect, provided herein is a method for preparing a cellulosic superabsorbent polymer (SAP), the method comprising: contacting a cellulose powder, a crosslinking agent selected from the group consisting of epichlorohydrin and ethylene glycol diglycidyl ether, and an aqueous crosslinking solution comprising an alkali metal hydroxide thereby forming the cellulosic SAP, wherein the crosslinking agent is present in the aqueous crosslinking solution at a concentration of 3% to 30% v/v and the cellulose powder is present in the aqueous crosslinking solution at a concentration of 0.1% to 5% wt/wt.

In a first embodiment of the first aspect, provided herein is the method of the first aspect further comprising the step of subjecting a post-consumer textile comprising cotton and polyethylene terephthalate (PET) to an organic acid catalyzed hydrothermal treatment thereby forming the cellulose powder.

In a second embodiment of the first aspect, provided herein is the method of the first embodiment of the first aspect, wherein the hydrothermal treatment comprises subjecting the post-consumer textile to a temperature between 110-180° C. and autogenic pressure of 0.1-10 MPa.

In a third embodiment of the first aspect, provided herein is the method of the first aspect further comprising the step of contacting the cellulose powder with a carboxylic acid selected from the group consisting of citric acid, maleic acid, oxalic acid, and tartaric acid, sodium hypophosphite, and an aqueous condensation solution thereby forming a cellulose powder having a degree of substitution (DS) of 0.001-0.36 prior to the step of contacting the cellulose powder, a crosslinking agent selected from the group consisting of epichlorohydrin and ethylene glycol diglycidyl ether, and an aqueous crosslinking solution comprising an alkali metal hydroxide.

In a fourth embodiment of the first aspect, provided herein is the method of the third embodiment of the first aspect, wherein the carboxylic acid is citric acid, the DS is 0.09-0.206, and the crosslinking agent is epichlorohydrin.

In a fifth embodiment of the first aspect, provided herein is the method of the fourth embodiment of the first aspect, wherein the epichlorohydrin is present in the aqueous crosslinking solution at a concentration of 5-12% wt/wt.

In a sixth embodiment of the first aspect, provided herein is the method of the fourth embodiment of the first aspect, wherein the epichlorohydrin is present in the aqueous crosslinking solution at a concentration of 5-7% wt/wt.

In a seventh embodiment of the first aspect, provided herein is the method of the third embodiment of the first aspect, wherein the carboxylic acid is citric acid, the DS is 0.09-0.206, and the crosslinking agent is ethylene glycol diglycidyl ether, wherein the ethylene glycol diglycidyl ether is present in the aqueous crosslinking solution at a concentration between 12-20% wt/wt.

In an eighth embodiment of the first aspect, provided herein is the method of the sixth embodiment of the first aspect, wherein the cellulose powder is present in the aqueous crosslinking solution at a concentration of 3-5% wt/wt.

In a ninth embodiment of the first aspect, provided herein is the method of the seventh embodiment of the first aspect, wherein the cellulose powder is present in the aqueous crosslinking solution at a concentration of 3.7-4.3% wt/wt.

In a tenth embodiment of the first aspect, provided herein is the method of the first aspect, wherein the aqueous crosslinking solution further comprises urea at concentration of 0.1-5% wt/wt.

In a second aspect, provided herein is a method for preparing a cellulosic superabsorbent polymer (SAP), the method comprising: providing a cellulose powder, wherein the cellulose powder is prepared by subjecting a post-consumer textile comprising cotton and PET to an organic acid catalyzed hydrothermal treatment at a temperature between 110-180° C. and autogenic pressure of 0.1-10 MPa; and contacting the cellulose powder, a crosslinking agent selected from the group consisting of epichlorohydrin and ethylene glycol diglycidyl ether, and an aqueous crosslinking solution comprising an alkali metal hydroxide thereby forming the cellulosic SAP, wherein the crosslinking agent is present in the aqueous crosslinking solution at a concentration of 3% to 30% v/v and the cellulose powder is present in the aqueous crosslinking solution at a concentration of 2% to 6% wt/wt.

In a first embodiment of the second aspect, provided herein is the method of the second aspect further comprising the step of contacting the cellulose powder with a carboxylic acid selected from the group consisting of citric acid, maleic acid, oxalic acid, and tartaric acid; a catalyst selected from the group consisting of sodium hypophosphite and sodium hypophosphate; and an aqueous condensation solution thereby forming a cellulose powder having a degree of substitution (DS) of 0.001-0.36 prior to the step of contacting the cellulose powder, a crosslinking agent selected from the group consisting of epichlorohydrin and ethylene glycol diglycidyl ether, and an aqueous crosslinking solution comprising an alkali metal hydroxide.

In a second embodiment of the second aspect, provided herein is the method of the first embodiment of the second aspect, wherein the carboxylic acid is citric acid, the DS is 0.05-0.229, and the crosslinking agent is epichlorohydrin, wherein the epichlorohydrin is present in the aqueous crosslinking solution at a concentration of 5-7% wt/wt and the cellulose powder is present in the aqueous crosslinking solution at a concentration of 3.7-4.3% wt/wt.

In a third embodiment of the second aspect, provided herein is the method of the first embodiment of the second aspect, wherein the carboxylic acid is citric acid, the DS is 0.09-0.206, and the crosslinking agent is ethylene glycol diglycidyl ether, wherein the ethylene glycol diglycidyl ether is present in the aqueous crosslinking solution at a concentration between 12-20% wt/wt and the cellulose powder is present in the aqueous crosslinking solution at a concentration of 3.7-4.3% wt/wt.

In a fourth embodiment of the second aspect, provided herein is the method of the second embodiment of the second aspect, wherein the cellulosic SAP has a free swelling capacity (FSC) measured by ISO (17190-5:2001) between 23 and 30 gram saline solution per gram of the cellulosic SAP.

In a fifth embodiment of the second aspect, provided herein is the method of the third embodiment of the second aspect, wherein the cellulosic SAP has a FSC measured by ISO (17190-5:2001) between 5 and 17 gram saline solution per gram of the cellulosic SAP.

In a sixth embodiment of the second aspect, provided herein is the method of the second aspect, wherein the aqueous crosslinking solution further comprises urea at concentration of 0.1-5% wt/wt.

In an eighth embodiment of the second aspect, provided herein is the method of the second aspect, wherein the step of contacting the cellulose powder, the crosslinking agent and the aqueous crosslinking solution is conducted at 40-50° C. for a period of 30 minutes to 3 days.

The present disclosure provides a method for producing cellulosic SAP from the degraded product of cellulose containing materials (such as cotton), whereas most of the commercial water-absorbing SAPs in the markets are made of acrylate or petrochemical-based material. In addition, the cellulosic SAP produced by the claimed method can have high water absorption capacity, which can absorb and retain more than 31 times of liquid relative to its own mass, and can be easily regenerated by oven drying at 80° C. or below.

The present disclosure addresses the issues of landfill limitation and the fiber supply chain by recovering polyesters, such as PET, for reuse, while potentially enabling an environmental friendly application to be developed for the recovered cellulose.

Being able to treat post-consumer textiles to their constituent materials and also to create an application (i.e. cellulosic SAP) by a relatively straight forward process will enable the technology to be more readily accepted and adopted by the industry. This will help the industry make a great step forward in fulfilling the vision of closed loop textile recycling.

Therefore, objects of the present disclosure include solving the problem of textile waste, and providing a more eco-friendly replacement of the non-sustainable petroleum based SAP products.

Those skilled in the art will appreciate that the disclosure described herein is susceptible to variations and modifications other than those specifically described.

Other aspects and advantages of the disclosure will be apparent to those skilled in the art from a review of the ensuing description.

BRIEF DESCRIPTION OF DRAWINGS

The above and other objects and features of the present disclosure will become apparent from the following description of the disclosure, when taken in conjunction with the accompanying drawings, in which.

DETAILED DESCRIPTION

Figure 1:
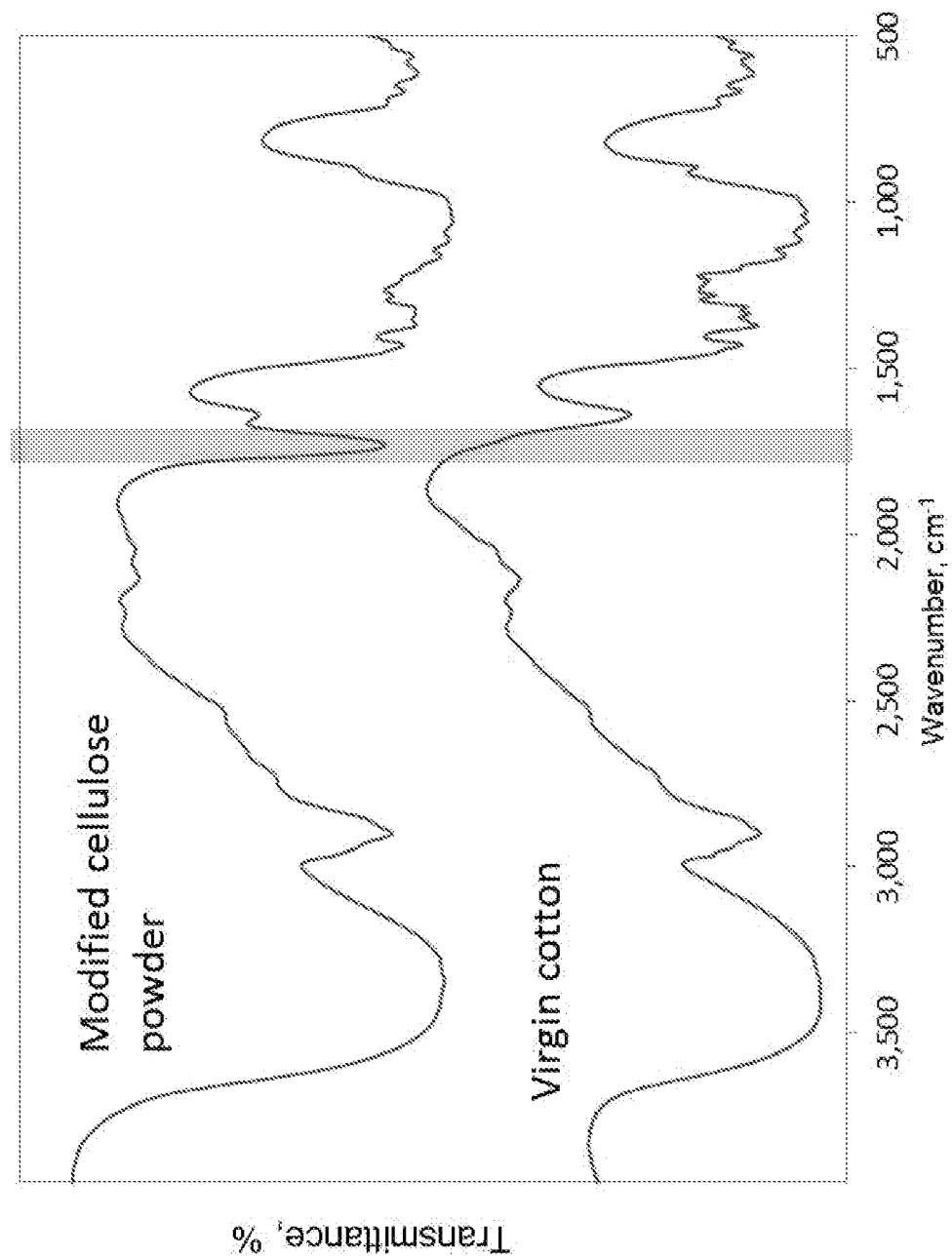
FIG. 1 shows exemplary Fourier-transform infrared spectroscopy (FTIR) spectra of modified cellulose powder obtained using the methods described herein and virgin cotton.

The present disclosure is not to be limited in scope by any of the specific embodiments described herein. The following embodiments are presented for exemplification only.

SAPs are able to absorb large amounts of liquid relative to their own mass, but do not dissolve in water. When water is added to SAP, it enters the polymer network due to the phenomenon of osmotic pressure. The cross-links between molecular chains prevent the SAP from dissolving in the water, but result in a swollen gel that is able to retain water even under the action of external pressure. Consequently, it has many different potential applications, such as the ingredient material of baby diapers, adult incontinent diapers or female sanitary napkins. Therefore, the important properties of SAP include its capacity to absorb water (FSC) and the ability to retain the absorbed water (CRC).

In the present disclosure, cellulose powder, which is a waste textile degradative product, is transformed into useful cellulosic SAP materials. Each D-glucose unit of cellulose contains three hydroxyl groups. Due to the large number of hydroxyl groups, cellulose can form extensive hydrogen bonding with water molecules to become swollen and absorb large amount of fluid.

The cellulose powder used in connection with the methods described herein can be prepared from any cellulosic raw material known in the art. The cellulose powder may be prepared, for example, from a natural cellulosic material, semi-synthetic cellulosic material, synthetic cellulosic material, or a combination thereof.

Natural cellulosic materials may be of plant or animal origin, and include, for example, those fibrous materials derived from natural products containing celluloses such as a wood, bamboo, cotton, hemp ramie, hoya, bagasse, kanaf, retting, mudrar, or bacterial cellulose. The natural cellulosic material may comprise one kind of natural cellulosic material from the above described materials, or may use a mixture of two or more such cellulosic materials.

Semi-synthetic cellulosic materials may include, for example, viscose, cuprammonium, polynosic, lyocell, and cellulose acetate.

The cellulose powder used in connection with the methods described herein can be prepared according to any method known in the art. In certain embodiments, the cellulose powder is prepared using a hydrolysis method. The hydrolysis method may be acid hydrolysis, alkaline oxidative decomposition, hydrothermal treatment, steam explosion, or the like, or a combination of two kinds of such methods.

The cellulose powder may be prepared, for example, by an organic acid catalyzed hydrothermal treatment of a post-consumer textile comprising a natural, semi-synthetic, and/or synthetic cellulosic material or a natural cellulosic material.

In certain embodiments, the cellulose powder is prepared by subjecting the post-consumer textile to an organic acid catalyzed hydrothermal treatment, the method comprising the step of bringing into contact the post-consumer textile, an aqueous solution, and an organic acid and heating the resulting mixture.

Hydrothermal treatment involves the chemistry of hot water under pressure to carry out chemical reactions. These reactions are usually conducted at temperatures ranging from 100 to 350° C. and pressures in the range from 0.1 to 15 MPa. In certain embodiments, the hydrothermal treatment is conducted at 120-150° C., 125-145° C., 130-140° C., or 132-138° C. In certain embodiments, the hydrothermal treatment is conducted at 0.1 to 0.5, 0.2 to 0.5, 0.2 to 0.4, or 0.25 to 0.35 MPa. The reaction medium may be water alone or in combination with inorganic and/or organic acids.

The organic acid can be methanesulfonic acid, oxalic acid, tartaric acid, citric acid, malic acid, formic acid, acetic acid, or a combination thereof. In certain embodiments, the hydrothermal treatment aqueous solution contains the organic acid catalyst in an amount of 0.1% to 30% or 0.5% to 10% wt/wt. The addition of a larger amount of acid can accelerate the rate of the hydrothermal treatment reaction can shorten the time required for completion and/or assist with decomposition of thicker and/or denser post-consumer textiles.

The post-consumer textile may comprise cotton or polyester and cotton, such as PET and cotton. In instances in which the post-consumer textile contains polyester, it may contain any proportion of polyester content, for example from 1-99% wt/wt.

The post-consumer textile can optionally be divided, e.g., by cutting, tearing, and/or shredding, into smaller pieces prior to the preparation of the cellulose powder. This optional step can improve the yield of cellulose powder and reduce treatment time by increasing the surface area of the treated post-consumer textile.

In certain embodiments, the ratio of solids (i.e., the post-consumer textile) to liquid is 1:30-200 or 1:50-150 by weight. Lower ratios of solid to liquid tend to accelerate the rate of the hydrothermal treatment reaction.

In certain embodiments, hydrothermal treatment comprises heating the mixture at a temperature between 110-180° C. In certain embodiments, hydrothermal treatment comprises heating the mixture at a temperature between 120-150° C. The temperature of the hydrothermal treatment can be increased at a rate of 4-6° C./minute from room temperature to the desired temperature (e.g., 110-180° C. or 120-150° C.).

In certain embodiments, the hydrothermal treatment is conducted at a pressure of 0.1 to 10 MPa or 0.1 to 1 MPa. In certain embodiments, hydrothermal treatment is conducted under autogenic pressure, i.e., pressure generated as a result of heating in a closed system. Alternatively or additionally, the pressure can be applied externally, e.g., by mechanical means.

In certain embodiments, the hydrothermal treatment is conducted in a closed high-pressure reactor, and the temperature is raised to 110-180° C. at a heating rate of 4-6° C./min and then maintained under stirring. During the hydrothermal treatment, the autogenous pressure in the closed higher-pressure reactor can be in the range of 0.10-1 MPa. The hydrothermal treatment can be completed in 0.5-3 h.

During hydrothermal treatment, subcritical conditions can be achieved in which the cotton fiber can undergo an acid catalyzed hydrolytic degradation reaction thereby producing cellulose powder, while not affecting the polyester fiber.

After separating the cellulose powder and the polyester fiber, the polyester fiber and the cellulose powder are separately recovered by filtration, and the specific steps include: filtering the mixture through a sieve (for example, a mesh of 20 mesh), and washing to obtain the polyester fiber. The remaining portion (the remaining mixture after filtration) is subjected to vacuum filtration through a filtration membrane, such as a PTFE (polytetrafluoroethylene) membrane, and washed to obtain cellulose powder. After the polyester fiber aggregate and the cellulose powder are obtained, they can optionally be dried in a forced air oven to a constant weight.

Figure 5:
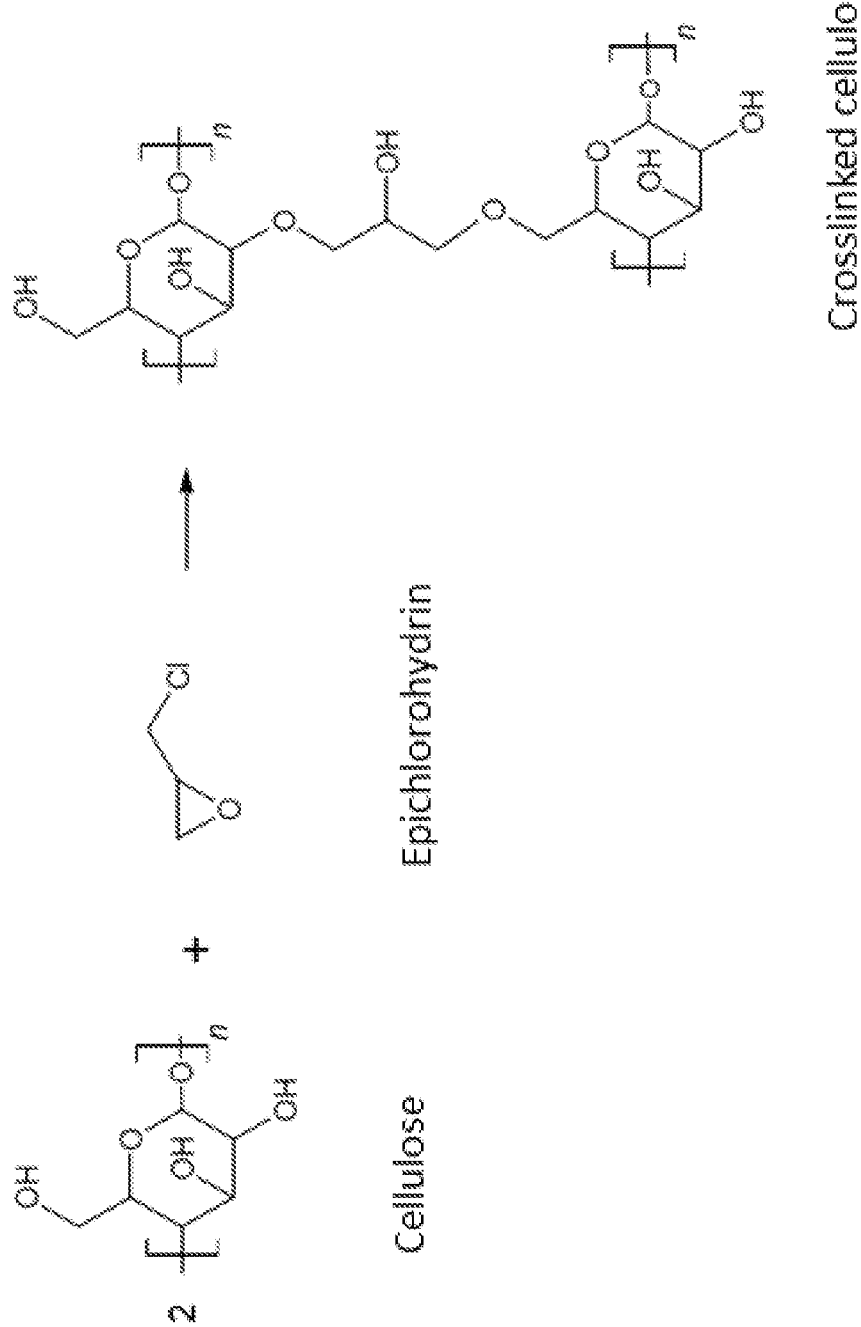
FIG. 5 shows the structures of epichlorohydrin (ECH), the simplified structure of the cellulose powder, and the crosslinking reaction of the cellulose powder with ECH according to certain embodiments described herein.
Figure 6:
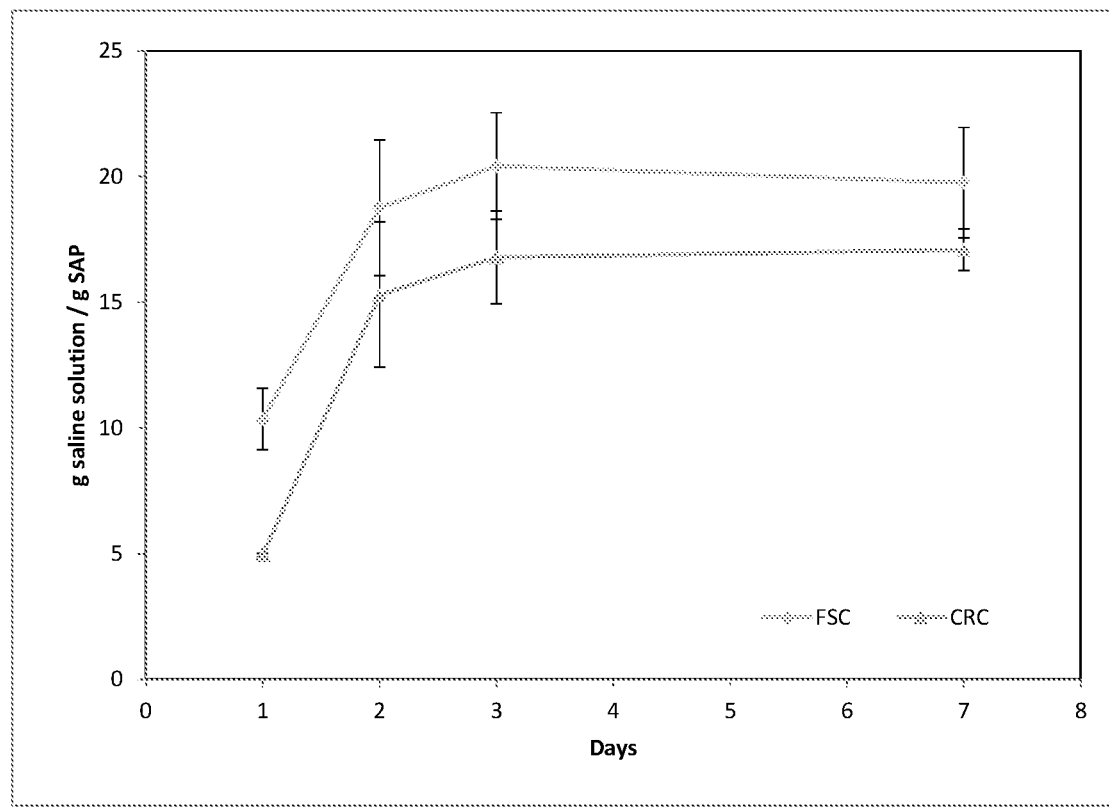
FIG. 6 shows a comparison of the free swelling capacity (FSC) and centrifuge retention capacity (CRC) of the cellulosic SAP samples prepared by running the crosslinking reaction between 0 and 8 days (cellulose content: 2%; solution: NaOH/urea; room temperature) using citric acid modified cellulose powder with a DS=0.09 at a concentration of 4% wt/wt in the aqueous crosslinking solution with epichlorohydrin at a concentration of 6.6% v/v in the aqueous crosslinking solution according to certain embodiments described herein.
Figure 7:
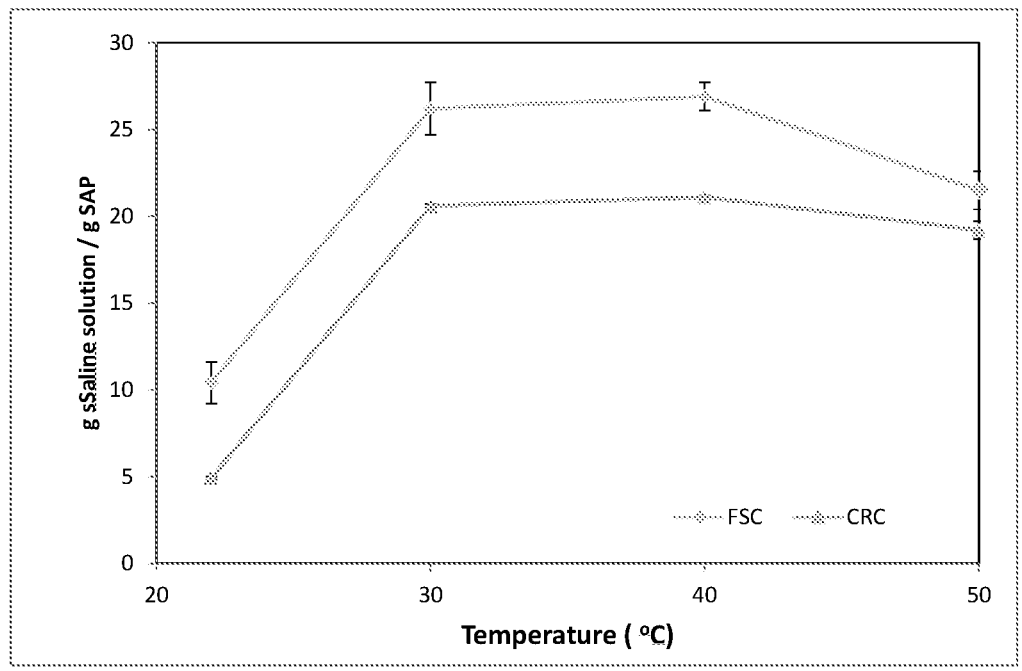
FIG. 7 shows a comparison of the FSC and CRC of the cellulosic SAP samples prepared by different gel setting temperatures for 1 day citric acid using modified cellulose powder with a DS=0.09 at a concentration of 4% wt/wt in the aqueous crosslinking solution with epichlorohydrin at a concentration of 6.6% v/v in the aqueous crosslinking solution according to certain embodiments described herein.
Figure 8:
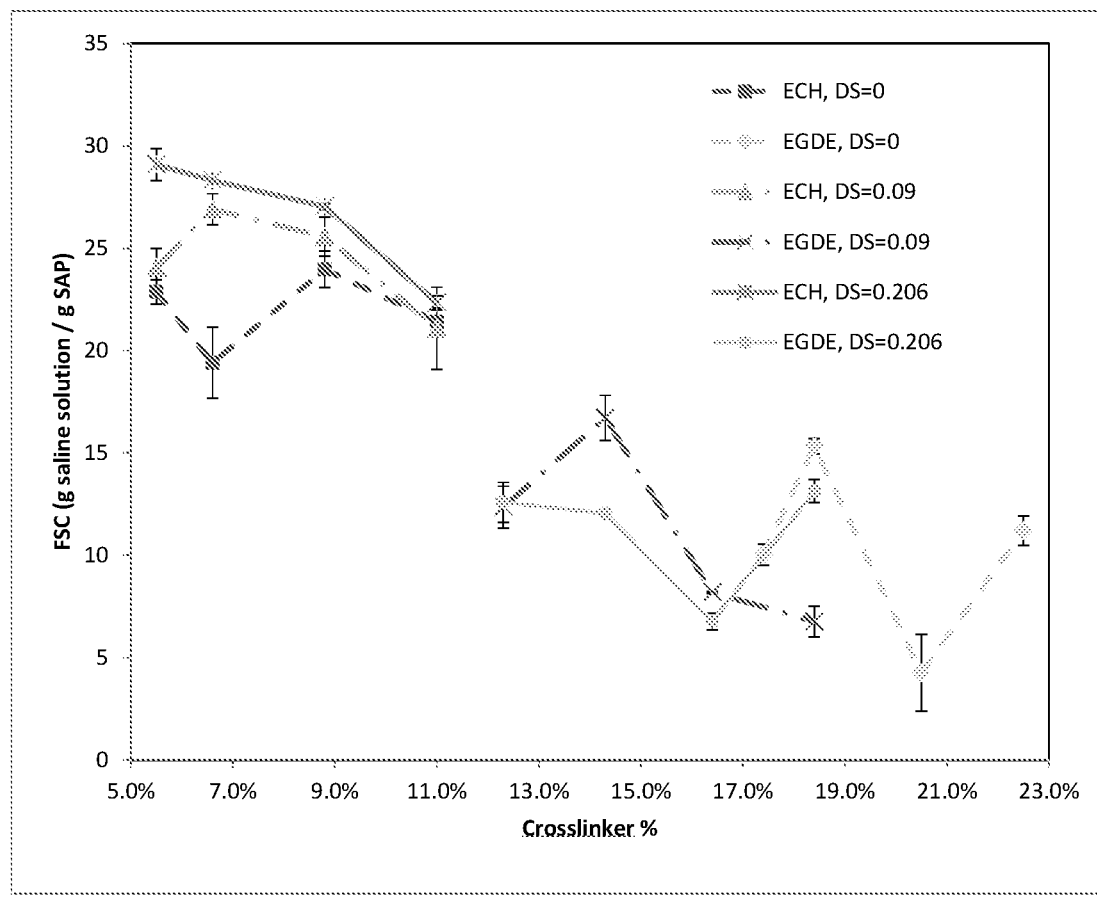
FIG. 8 shows a comparison of the FSC of cellulosic SAP crosslinked with ECH and EGDE at concentrations between 5-23% v/v of the crosslinker in the aqueous crosslinking solution, wherein the cellulosic SAP was present in the aqueous crosslinking solution at a concentration of 4% wt/wt and crosslinked at 40° C. for 1 day according to certain embodiments described herein.
Figure 9:
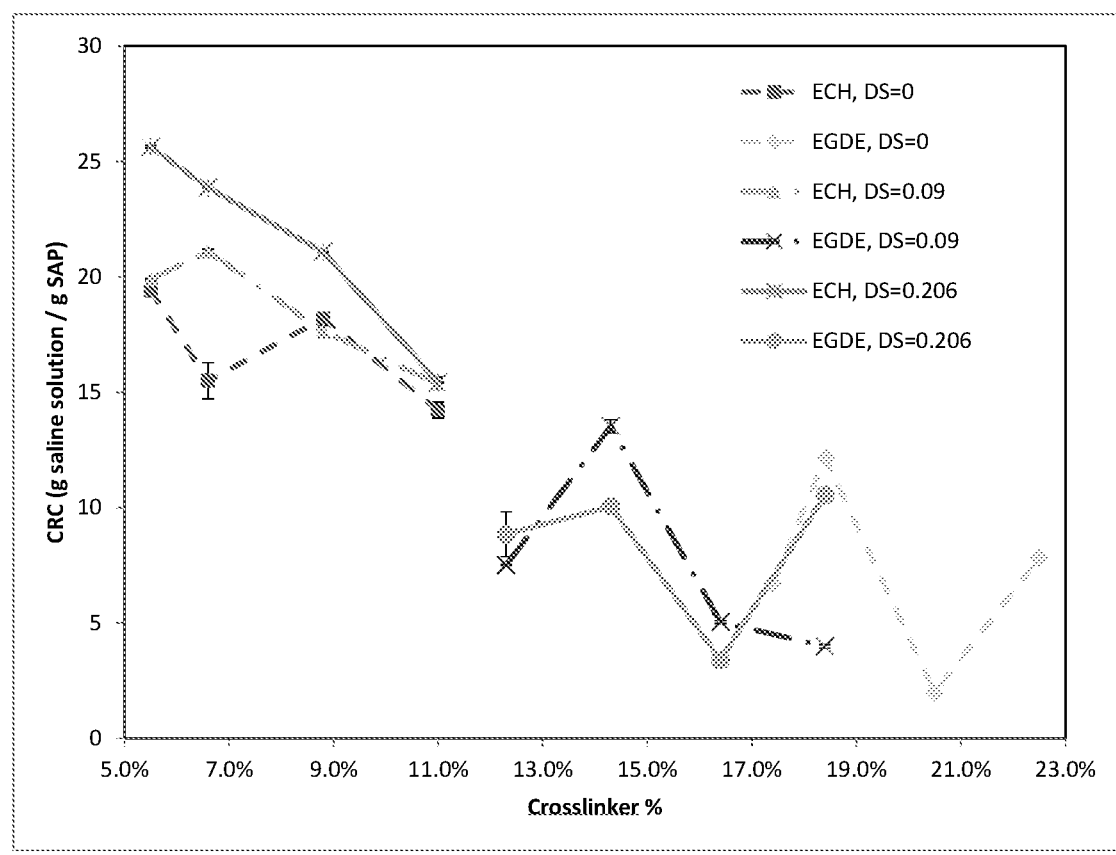
FIG. 9 shows a comparison of the CRC of cellulosic SAP crosslinked by ECH and EGDE at concentrations between 5-23% v/v of the crosslinker in the aqueous crosslinking solution, wherein the cellulosic SAP was present in the aqueous crosslinking solution at a concentration of 4% wt/wt and crosslinked at 40° C. for 1 days according to certain embodiments described herein.
Figure 10:
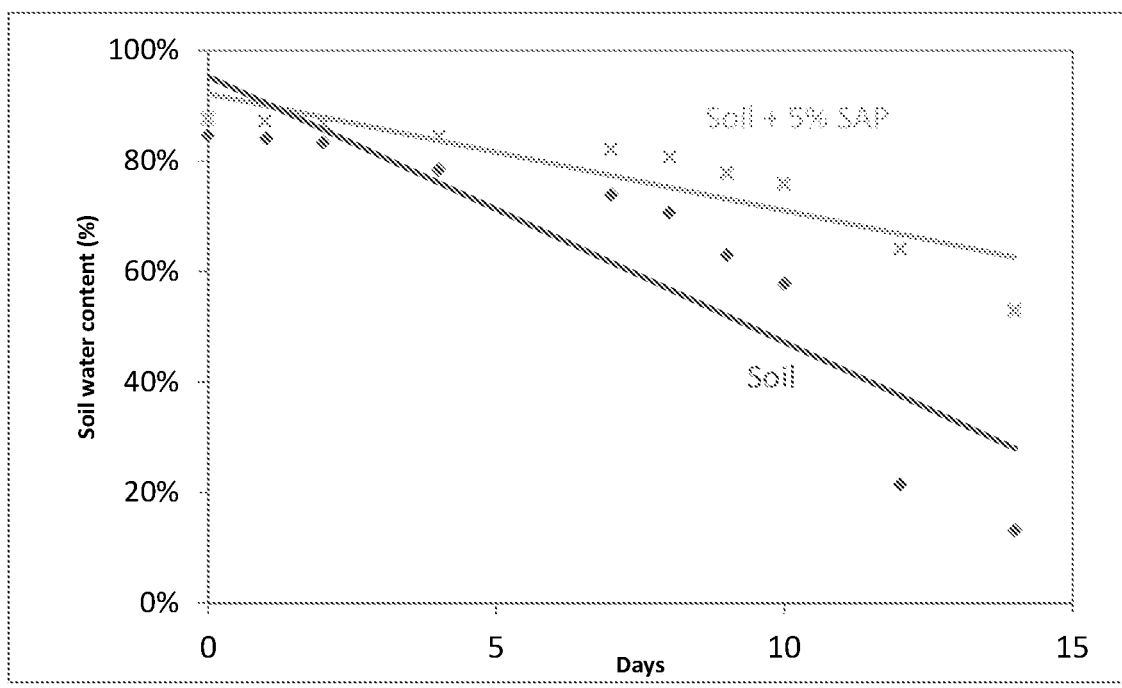
FIG. 10 shows the average rate of water loss of a control garden soil sample and a garden soil sample including 5% wt/wt of the cellulosic SAP according to certain embodiments described herein. The cellulosic SAP was prepared using citric acid modified cellulose powder with a DS=0.09 (4% wt/wt in the aqueous crosslinking solution), which was reacted with epichlorohydrin (6.6% v/v in the aqueous crosslinker solution) according to certain embodiments described herein. Water was added to both the control garden soil and the cellulosic SAP mixed garden soil until they were saturated. The saturated water content of the control soil contained 85% of water. In other words, the control soil can absorb 1.85 g of water/g of soil. After adding 5% of SAP, the saturated water content increased to 88%, i.e. the soil can absorb 2.75 g of water/g of soil.

The cellulose powder can be added to an aqueous crosslinking solution (e.g., distilled water, deionized water, untreated water, and combinations thereof) comprising an alkali metal hydroxide, such as sodium hydroxide, optionally at low temperature to minimize exothermic reactions. The crosslinking agent can then be added to the aqueous crosslinking solution to crosslink at least a part of the hydroxyl groups of the cellulose chains by nucleophilic addition of the hydroxyls on the cellulose with the crosslinking agent. An exemplary schematic showing the crosslinking of two D-glucose units in the cellulose powder with epichlorohydrin is shown in FIG. 5.

The cellulose powder can be present in the crosslinking solution at a concentration of 0.1-5% wt/wt. In certain embodiments, the cellulose powder can be present in the crosslinking solution at a concentration of 0.5-5%, 1-5%, 1.5-5%, 2.0-5%, 3.0-5%, 3.5-5%, 3.5-4.5%, 3.6-4.4%, 3.7-4.3%, 3.8-4.2%, or 3.9-4.1% wt/w. In certain embodiments, the cellulose powder can be present in the crosslinking solution at a concentration of 4% wt/wt.

The crosslinking agent can be epichlorohydrin, epibromohydrin, 3-chloro-1,2-propanediol, 3-bromo-1,2-propanediol, ethylene glycol diglycidyl ether, or a combination thereof. In certain embodiments, the crosslinking agent is epichlorohydrin or ethylene glycol diglycidyl ether. The crosslinking agent can be present in the aqueous crosslinking solution at a concentration of 1-20% by wt/wt. In certain embodiments, the crosslinking agent is present in the aqueous solution at a concentration of 5-10%, 5-7%, 10-20%, or 12-20% by wt/wt. In certain embodiments, the crosslinking agent is present in the aqueous solution at a concentration of 3-30%, 3-25%, 3-20%, 3-15%, 3-10%, or 5-10% by v/v. In certain embodiments, the crosslinking agent is epichlorohydrin and is present in the aqueous crosslinking solution at a concentration of 5-10% or 5-7% by wt/wt. In certain embodiments, the crosslinking agent is ethylene glycol diglycidyl ether and is present in the aqueous crosslinking solution at a concentration of 10-20% or 12-20% by wt/wt.

In certain embodiments, the crosslinking agent is present in the aqueous crosslinking solution at a concentration of 5-7% by v/v and the cellulose powder is present in the aqueous crosslinking solution at a concentration of 3-5% by wt/wt. In certain embodiments, the crosslinking agent is present in the aqueous crosslinking solution at a concentration of 6.6% by v/v and the cellulose powder is present in the aqueous crosslinking solution at a concentration of 4% by wt/wt.

The alkali metal hydroxide can be lithium hydroxide, sodium hydroxide, potassium hydroxide, cesium hydroxide, or a combination thereof. The alkali metal hydroxide can be present in the aqueous crosslinking solution at a concentration of 1-10% or 6-10% wt/wt. In certain embodiments, the alkali metal hydroxide is sodium hydroxide.

Since hydroxyl groups are generally weak nucleophiles, a catalyst can optionally be added to accelerate the rate of reaction. In certain embodiments, the catalyst is urea. As shown in Table 1, the addition of urea to the crosslinking reaction can result improved crosslinking and increased yields of the cellulosic SAP. The urea can present in the aqueous crosslinking solution at a concentration of 0.1 to 10%, 0.1 to 5%, 2 to 4%, 2.5 to 3.5%, 3 to 5%, or 4 to 5% wt/wt. In certain embodiments, urea is present in the aqueous crosslinking solution at a concentration 3% wt/wt.

In certain embodiments, the cellulose powder and aqueous solution comprising the alkali metal hydroxide and optionally urea are combined. The temperature of the resulting solution can be maintained at −5 to −15° C. while all components dissolve in the aqueous solution, which typically requires 5-15 minutes. The crosslinking agent can then be added to the reaction solution and then stirred at room temperature for 15-90 minutes. The reaction solution can then be heated to 40-50° C. and the reaction is allowed to proceed until substantially all starting materials have been consumed and/or reaction substantially completes. In certain embodiments, the crosslinking reaction is allowed to proceed for a period of 30 minutes, 1 hour, 3 hours, 6 hours, 12 hours, 18 hours, 1 day, 2 days, 3 days, 4 days, or longer.

During the course of the reaction, the product will solidify and once the reaction is complete or is halted, the product can be collected by filtration and optionally purified by one or more solid-liquid deionized water extractions. In certain embodiments, the one or more solid-liquid deionized water extractions can be conducted by immersing the crude cellulosic SAP in deionized water, which can be changed daily with fresh deionized water until the conductivity of the water becomes substantially the same as pure deionized water.

The purified cellulosic SAP can then be dried, e.g., at room temperature or elevated temperature, reduced pressure, or a combination thereof. In certain embodiments, the cellulosic SAP is dried at 50-90° C.

Once dry, the cellulosic SAP can be milled to a desired particle size. In certain embodiments, the cellulosic SAP is milled to a particle size of 100 nm to 700 nm.

In instances in which the crosslinking agent is epichlorohydrin or the like, upon completion of the crosslinking reaction, any unreacted crosslinking agent can optionally be hydrolyzed to non-toxic water soluble glycerol and separated from the cellulosic SAP by filtration.

In general, the water absorption ability properties of the cellulosic SAPs described herein can increase with increasing molecular weight of the cellulose raw material. Since the cellulose powder is a degradative product with much lower average molecular weight relative to virgin cotton, the FSC and CRC values are expected to be lower than those of virgin cotton. By modifying the chemical functionality of the cellulose powder through chemical modification, e.g., prior to crosslinking, the water absorption properties of the resultant cellulosic SAP can be improved. Without wishing to be bound by theory, it is believed that the water properties of the cellulosic SAP can be improved by chemical modification due to the Donnan equilibrium established between the SAP gel and the external solution in the presence of fixed charge functional groups (e.g., carboxylate anions) on the polymer chains.

In certain embodiments, provided herein is a method of preparing a cellulosic SAP, the method comprising the steps of providing a cellulose powder, wherein the cellulose powder is prepared by subjecting a post-consumer textile comprising cotton and PET to an organic acid catalyzed hydrothermal treatment; contacting the cellulose powder with a carboxylic acid, optionally a catalyst, and an aqueous condensation solution (e.g., distilled water, deionized water, untreated water, and combinations thereof) thereby forming a modified cellulose powder, wherein the modified cellulose powder has a higher DS than the cellulose powder; and contacting the modified cellulose powder, a crosslinking agent, and an aqueous crosslinking solution comprising an alkali metal hydroxide thereby forming the cellulosic SAP.

Figure 4:
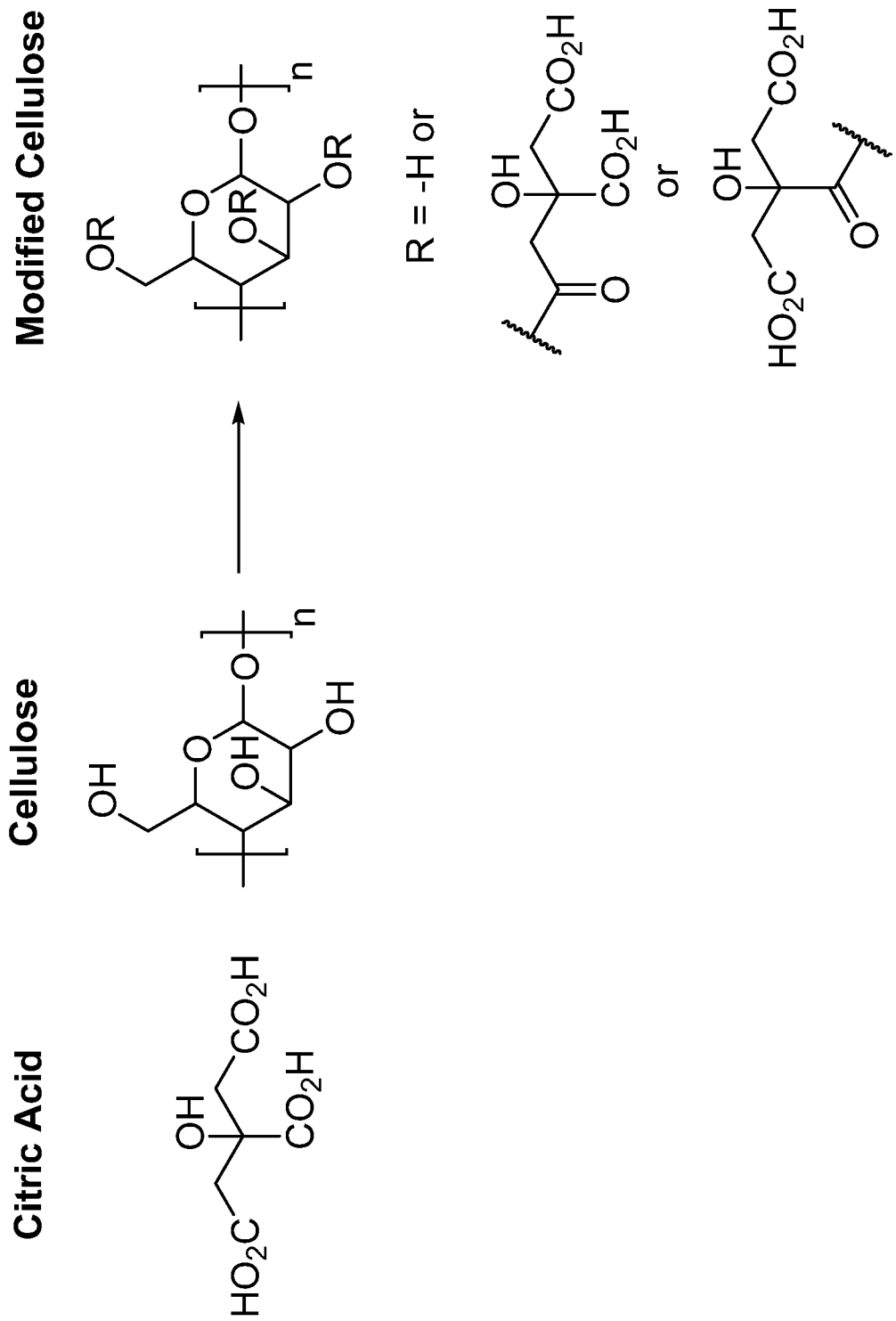
FIG. 4 shows the structures of citric acid, the simplified structure of the cellulose powder and the chemical modification of the cellulose powder with citric acid as the organic acid and the chemical structure of the modified cellulose according to certain embodiments described herein.

The DS of the cellulose powder can be increased by chemically modifying the cellulose powder prior to the crosslinking reaction by condensation with a carboxylic acid, such as a di-, tri-, tetra-, or penta-carboxylic acid thereby forming a chemically modified cellulose powder having an increased DS. An exemplary schematic showing the chemical modification of the cellulose powder with a citric acid is shown in FIG. 4.

The condensation of the carboxylic acid with the cellulose powder can be conducted by soaking the cellulose powder in an aqueous condensation solution with the carboxylic acid and optionally a catalyst, such as sodium hypophosphite.

Exemplary carboxylic acids useful for modifying the DS of the cellulose powder include, but are not limited to, succinic acid, glutaric acid, maleic acid, fumaric acid, tartronic acid, tartaric acid, adipic acid, citric acid, isocitric acid, aconitic acid, and propane-1,2,3-tricarboxylic acid. In certain embodiments, the carboxylic acid is selected from the group consisting of citric acid, maleic acid, oxalic acid, and tartaric acid.

The di-, tri-, tetra-, or penta-carboxylic acid can be added to the condensation reaction, which results in the addition of an additional 1-10% or 5-10% wt/wt of the carboxylic acid in the aqueous condensation solution.

In certain embodiments, the condensation of the cellulose powder with a carboxylic acid is catalyzed by hypophosphite salt or hypophosphate, such as sodium hypophosphite. In certain embodiments, the hypophosphite or hypophosphate salt (e.g., an alkali metal or alkaline earth metal, such as sodium hypophosphite or sodium hypophosphate) is present in the aqueous condensation solution at a concentration of 1-15%, 5-15%, or 5-10% wt/wt.

If a di-, tri-, tetra-, or penta-carboxylic acid, such as citric acid, is used in the organic acid catalyzed hydrothermal treatment of the post-consumer textile, a portion of the hydroxyl groups in the formed cellulose powder may undergo condensation with the carboxylic acid resulting in a DS>0. As demonstrated in Table 2, the DS of the cellulose powder formed by citric acid catalyzed hydrothermal treatment is 0.094 and can be increased to 0.229 by the addition of sodium hypophosphite and/or additional amounts of citric acid to the aqueous condensation solution.

TABLE 1

DS values of the modified cellulose powders prepared by reaction with different concentrations of organic acid or/and catalyst in the aqueous condensation solution.

| Acid used in hydrothermal treatment | Extra organic acid added (wt/wt %) | Catalyst added (wt/wt %) | DS value |
|---|---|---|---|
| Citric acid | 0% | 0% | 0.094 |
| | 0% | Sodium hypophosphite 5% | 0.206 |
| | Citric acid 5% | Sodium hypophosphite 5% | 0.229 |
| | 0% | Sodium hypophosphite 10% | 0.181 |
| | Citric acid 5% | Sodium hypophosphite 10% | 0.220 |
| | Citric acid 10% | Sodium hypophosphite 10% | 0.207 |

In certain embodiments, the DS of the chemically modified cellulose powder is 0.001-0.40, 0.001-0.35, 0.001-0.30, 0.001-0.25, 0.05-0.25, 0.1-0.25, 0.09-0.20, 0.09-0.206, 0.1-0.25, 0.15-0.25, 0.2-0.25, 0.10-0.40, 0.15-0.40, 0.20-0.40, 0.25-0.40, 0.30-0.40, 0.14-0.40, or 0.143-0.363. In certain embodiments, the DS of the chemically modified cellulose powder is 0.07 to 0.12, 0.07 to 0.11, 0.07 to 0.1, or 0.08 to 0.1.

The procedures for modification of cellulose powder and synthesis of cellulosic SAP of exemplary embodiments are explained as follow:

Modification of Cellulose Powder

The cellulose powder was obtained after hydrothermal treatment of a PET/cotton blend textile (Detailed embodiment refers to China Pat. No. 2017108069704). After hydrothermal treatment with acid, such as hydrochloric acid, citric acid, maleic acid or methanesulfonic acid, the wet cellulose powder is obtained by filtration without purification. (Step 1) Optionally grind the cellulose powder into smaller size. (2) Optionally add additional organic acid and a catalyst, such as sodium hypophosphite, and soak the wet powder. (3) Dry the powder with air blowing at 40-60° C. (4) Place the dried powder in oven at 80-170° C. for 0.5-6 h.

A typical FTIR spectrum of the modified cellulose powder is shown in FIG. 1. Comparing with the virgin cotton (FIG. 1), an extra ester C=O stretching peak at 1732 $cm^{-1}$ indicates that carboxylic groups have been grafted onto the cellulose powder. The molecular masses and mass distributions of the resultant cellulose powder and its original cotton were measured by gel permeation chromatography with multi-angle laser light scattering detector (GPC-MALLS). The number average molecular weight ($M_n$) of the cellulose powder was reduced from 964 to 29 kg/mol after hydrothermal treatment, showing obvious degree of degradation and shortening of polymer chains. The degree of substitution (DS) was determined by titration method to calculate the amount of carboxylic groups grafted to the cellulose chain. The DS of the resultant modified cellulose powder was 0.143-0.363. The process flow of the modification of cellulose powder was illustrated at FIG. 2A.

Synthesis of Cellulosic SAP (Step 1) Wash the cellulose powder or modified cellulose powder once or several times and was dried. (2) Add the dried powder to sodium hydroxide (6-15 wt. %)/urea (0-5 wt. %) solution with mass percentage of 1-10%. (3) Mechanically stir the mixture at −5 to −15° C. for 5-15 min to dissolve the powder. Alternatively, pre-cool the sodium hydroxide/urea solution to −5 to −15° C. Add the cellulose powder and mechanically stir the mixture until the temperature of the mixture was increased back to room temperature. (4) Add epichlorohydrin (1-10 wt. %) to the solution followed by intensive stirring for 15-90 min at room temperature. (5) Allow the mixture to solidify at room temperature to 50° C. for 3 h-3 days under closed environment. (6) Cut the solid SAP into smaller piece, such as 0.1-10 cm$^3$. (7) Purify the SAP by immersing in DI water with daily change of fresh DI water until the conductivity of the water become similar to the fresh counterpart. (8) Dry the purified SAP sample in oven at 50-90° C. The process flow of the synthesis of cellulosic SAP was illustrated at FIG. 2B.

The used DI water was neutralized with citric acid. The formed sodium citrate by-product is relatively valuable and can be sold.

The dry SAP was milled into suitable size between 0.1-1.0 mm by a centrifuge mill. The SAP granules were classified based on their particle size by sieving method. The FSC and CRC of the resultant SAPs were measured by ISO (17190-5:2001) and EDANA (ERT 441.2-02) testing methods, respectively. The FSC and CRC of the cellulosic SAPs were 12.3-31.4 g saline solution/g SAP and 7.4-26.6 g saline solution/g SAP, respectively. The SAP synthesized from the modified cellulose powder showed higher water absorption than those from the unmodified cellulose powder.

Figure 2:
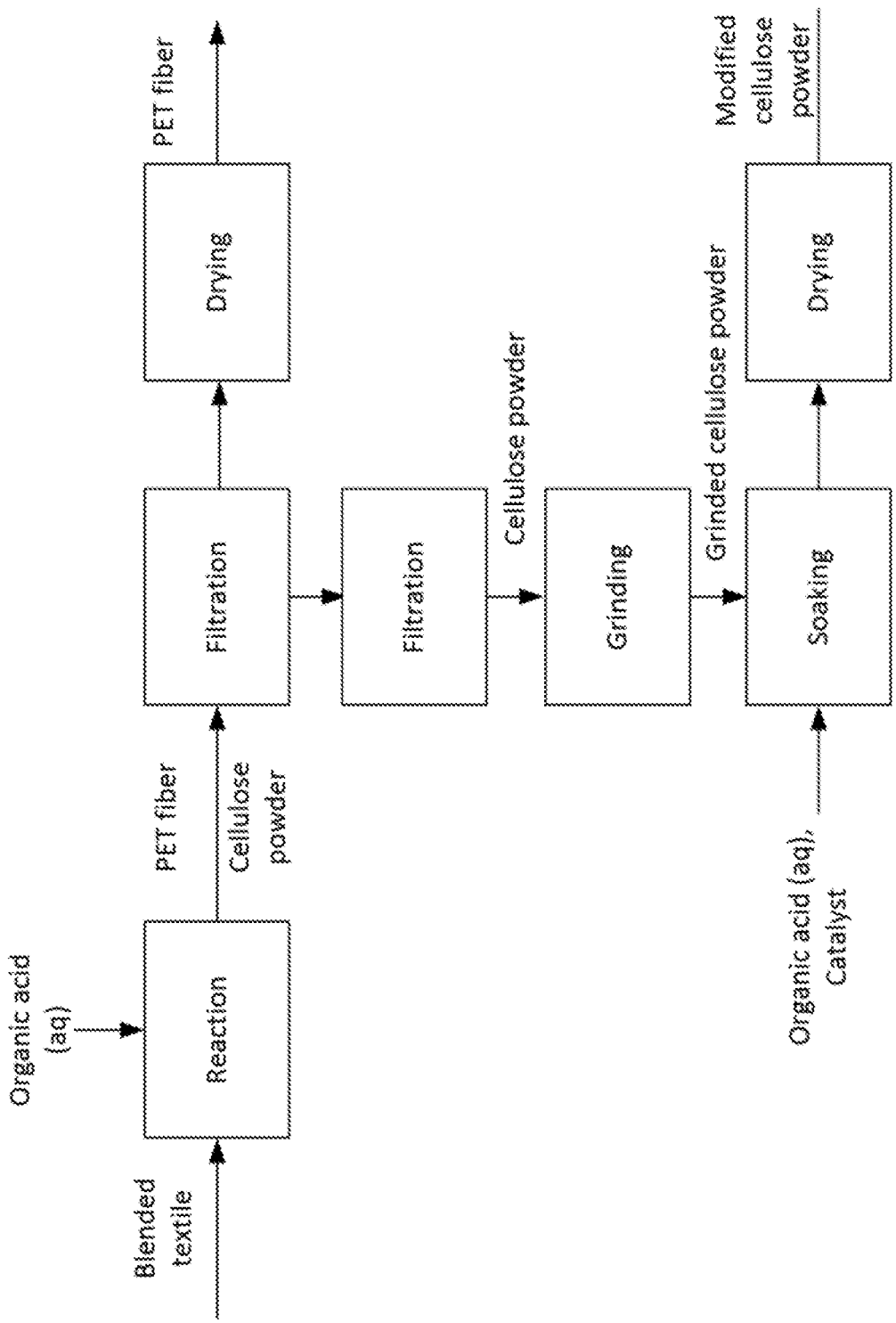
FIG. 2 shows a process flow diagram of modification of cellulose powder and synthesis of cellulosic SAP according to certain embodiments described herein.
Figure 2:
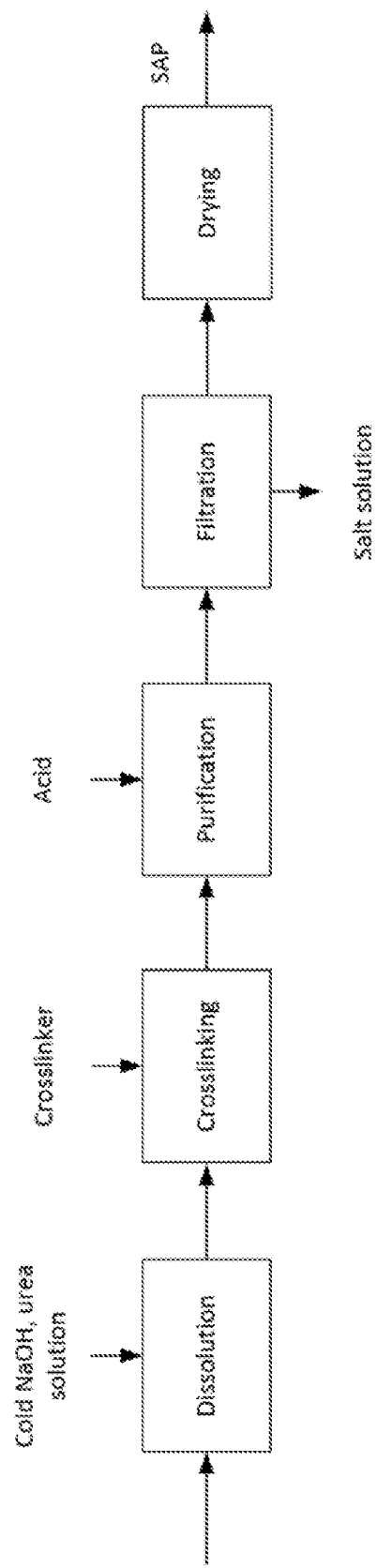
Figure 3:
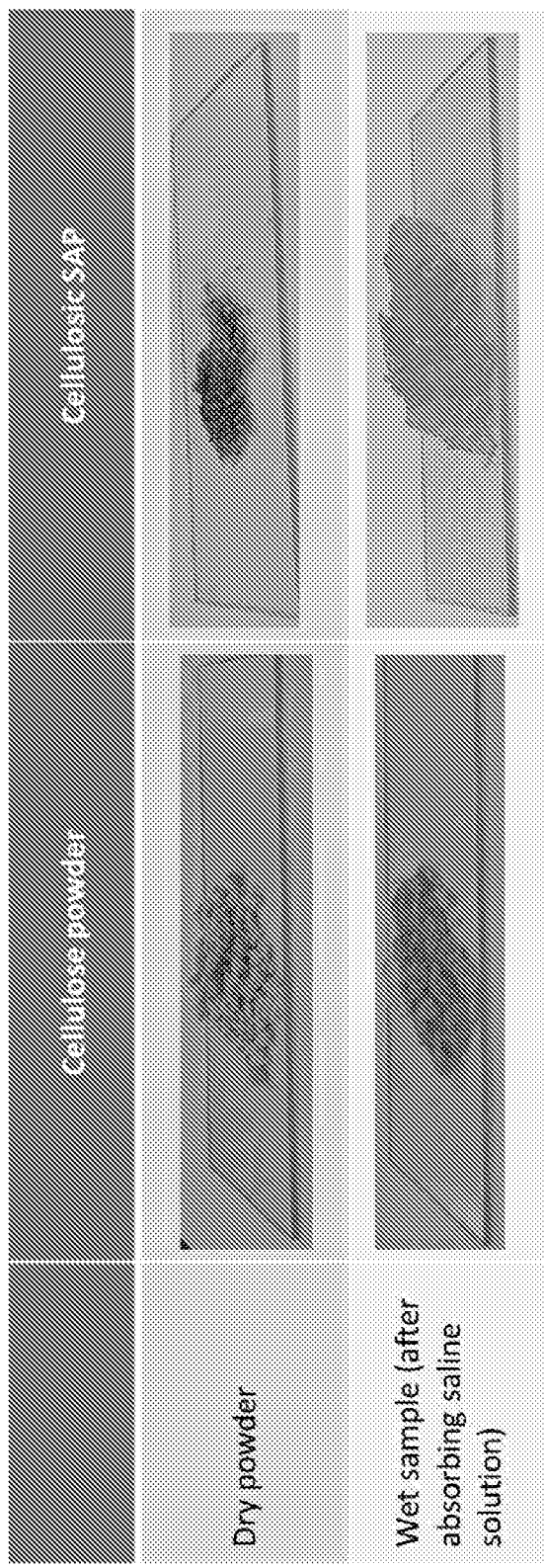
FIG. 3 shows pictures of cellulose powder and cellulosic SAP prepared in accordance with the methods described herein before and after absorption of 0.9% saline solution.

After absorbing solution, the cellulosic SAP swells to form rigid gel texture and gives large expansion in size (FIG. 2). Whereas, the cellulose powder only absorbs very small amount of solution and collapse into mash (FIG. 2).

EXAMPLES

Example 1—Preparation of Cellulose Powder from Textiles 15 g of white shirt textile waste with a ratio of polyester/cotton ratio of 65/35 was placed in 1.8 L of 5% (wt/wt) citric acid aqueous solution in an autoclave reaction vessel. Under high pressure, the autoclave was heated at a rate of 5° C./min. The degradation reaction of cotton fibers was carried out at 130° C. for 1.5 h.

After the reaction was completed, the heat was turned off, and after the autoclave reaction vessel was cooled to room temperature, the autoclave reaction vessel was opened, and the reaction product was taken out.

The reaction product was filtered through a sieve to obtain polyester fiber, and the remaining mixture is vacuum filtered through a filtration membrane to obtain cotton fiber fragments, which are then separately washed and dried in a forced air oven to a constant weight to obtain a polyester. The recovery of the fiber aggregate was 98%, and the recovery rate of the cellulose material was 83%.

Example 2—Preparation of Cellulose Powder from Textiles 17 g of sheets of textile waste with a polyester/cotton ratio of 20/80 were placed in 1.5 L of an aqueous solution containing 1% (wt/wt) methanesulfonic acid in an autoclave reaction vessel, and the autoclave reaction vessel was heated to 140° C. at a heating rate of 6° C./min for 1 h.

After the reaction was completed, the heat was turned off, and after the autoclave reaction vessel cooled to room temperature, the reaction vessel was opened, and the reaction product was taken out.

The reaction product is filtered through a sieve to obtain polyester fiber, and the remaining mixture is vacuum filtered through a filtration membrane to obtain cotton fiber fragments, which are respectively washed and dried in a forced air oven to a constant weight to obtain a polyester fiber. The recovery of the aggregate was 99%, and the recovery of cellulose material was 81%.

Example 3—SAP Prepared from Unmodified Cellulose Powder

The cellulose powder was washed once or several times and was dried. The dried powder was added to sodium hydroxide (6-15 wt. %)/urea (0-5 wt. %) solution with mass percentage of 2-4%. The mixture was mechanically stirred at −8 to −13° C. for 10-15 min to dissolve the cellulose powder. After rising back to room temperature, Epichlorohydrin (1-10 wt. %) was added to the solution followed by intensive stirring for 15-30 min at room temperature. After that, the mixture was allowed to solidify at room temperature to 50° C. for 30 minutes-3 days under closed environment. The solid SAP was cut into smaller piece, such as 0.1-10 cm$^3$. The SAP was purified by immersing in DI water with daily change of fresh DI water until the conductivity of the water became similar to the fresh counterpart. The purified SAP sample was dried in oven at 50-90° C. The FSC and CRC of the cellulosic SAPs were 12.3-22.9 g saline solution/g SAP and 7.4-20.0 g saline solution/g SAP, respectively.

Example 4—SAP Prepared from Modified Cellulose Powder

After hydrothermal treatment catalyzed with citric acid, the cellulose powder was obtained by filtration without purification. Additional acid was mixed to the wet powder. After blow drying at 40-60° C., the powder was placed in oven at 100-180° C. for 0.5-6 h. The DS of the modified cellulose powder was 0.143-0.295.

The modified cellulose powder was washed for several times and was dried. The dried powder was added to sodium hydroxide (6-15 wt. %)/urea (0-5 wt. %) solution with mass percentage of 1-5%. The mixture was mechanically stirred at −8 to −15° C. for 10-15 min to dissolve the powder. After rising back to room temperature, epichlorohydrin (1-10 wt. %) was added to the solution followed by intensive stirring for 15-30 min at room temperature. After that, the mixture was allowed to solidify at room temperature to 40° C. for 3 h-3 days under closed environment. The solid SAP was cut into smaller piece, such as 0.1-10 cm$^3$. The SAP was purified by immersing in DI water with daily change of fresh DI water until the conductivity of the water became similar to the fresh counterpart. The purified SAP sample was dried in oven at 50-90° C. The FSC and CRC of the cellulosic SAPs were 19.4-31.4 g saline solution/g SAP and 12.4-26.6 g saline solution/g SAP, respectively.

The present disclosure may be embodied in other specific forms without departing from the spirit or essential characteristics thereof. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

INDUSTRIAL APPLICABILITY

The cellulosic SAPs prepared according to the methods provided herein are able to absorb large amount of a liquid relative to their own mass but do not dissolve in water. Consequently, the cellulosic SAPs have many different potential applications, such as agricultural water retention agent, the absorbent materials for baby diapers, adult incontinent diapers or female sanitary napkins. Being an agricultural water retention agent (e.g. growing cotton), the cellulosic SAP can be used for adapting agricultural land to address extreme climate, e.g. drought and over-rain, in the agriculture industry.

What is claimed is:

1. A method for preparing a cellulosic superabsorbent polymer (SAP), the method comprising:
   contacting a cellulose powder having a degree of substitution (DS) of 0-0.206, epichlorohydrin, and an aqueous crosslinking solution comprising an alkali metal hydroxide thereby forming the cellulosic SAP, wherein epichlorohydrin has an initial concentration of 5% to 10% v/v in the aqueous crosslinking solution and the cellulose powder has an initial concentration of 0.1% to 5% wt/wt in the aqueous crosslinking solution.

2. The method of claim 1 further comprising the step of subjecting a post-consumer textile comprising cotton and polyethylene terephthalate (PET) to an organic acid catalyzed hydrothermal treatment thereby forming the cellulose powder.

3. The method of claim 2, wherein the hydrothermal treatment comprises subjecting the post-consumer textile to a temperature between 110-180° C. and autogenic pressure of 0.1-10 MPa.

4. The method of claim 1 further comprising the step of contacting the cellulose powder with a carboxylic acid selected from the group consisting of citric acid, maleic acid, oxalic acid, and tartaric acid, sodium hypophosphite, and an aqueous condensation solution thereby forming a cellulose powder having a degree of substitution (DS) of 0-0.206 prior to the step of contacting the cellulose powder, epichlorohydrin, and an aqueous crosslinking solution comprising an alkali metal hydroxide.

5. The method of claim 4, wherein the carboxylic acid is citric acid.

6. The method of claim 5, wherein the epichlorohydrin has an initial concentration of 5-7% wt/wt in the aqueous crosslinking solution.

7. The method of claim 6, wherein the cellulose powder has an initial concentration of 3-5% wt/wt in the aqueous crosslinking solution.

8. The method of claim 4, wherein the cellulose powder has an initial concentration of 3.7-4.3% wt/wt in the aqueous crosslinking solution.

9. The method of claim 1, wherein the aqueous crosslinking solution further comprises urea at concentration of 0.1-5% wt/wt.

10. The method of claim 1, wherein the cellulose powder is prepared by subjecting a post-consumer textile comprising cotton and polyethylene terephthalate (PET) to an organic acid catalyzed hydrothermal treatment at a temperature between 110-180° C. and autogenic pressure of 0.1-10 MPa; and
   the cellulose powder has an initial concentration of 2% to 6% wt/wt in the aqueous crosslinking solution.

11. The method of claim 10 further comprising the step of contacting the cellulose powder with a carboxylic acid selected from the group consisting of citric acid, maleic acid, oxalic acid, and tartaric acid; a catalyst selected from the group consisting of sodium hypophosphite and sodium hypophosphate; and an aqueous condensation solution thereby forming a cellulose powder having a degree of substitution (DS) of 0-0.206 prior to the step of contacting the cellulose powder, epichlorohydrin, and an aqueous crosslinking solution comprising an alkali metal hydroxide.

12. The method of claim 11, wherein the carboxylic acid is citric acid and the DS is 0-0.206, wherein the epichlorohydrin has an initial concentration of 5-7% wt/wt in the aqueous crosslinking solution and the cellulose powder has an initial concentration of 3.7-4.3% wt/wt in the aqueous crosslinking solution.

13. The method of claim 12, wherein the cellulosic SAP has a free swelling capacity (FSC) measured by ISO (17190-5:2001) between 23 and 30 gram saline solution per gram of the cellulosic SAP.

14. The method of claim 11, wherein the cellulosic SAP has a FSC measured by ISO (17190-5:2001) between 5 and 17 gram saline solution per gram of the cellulosic SAP.

15. The method of claim 10, wherein the aqueous crosslinking solution further comprises urea at concentration of 0.1-5% wt/wt.

16. The method of claim 10, wherein the step of contacting the cellulose powder, epichlorohydrin and the aqueous crosslinking solution is conducted at 40-50° C. for a period of 30 minutes to 3 days.

* * * * *